United States Patent [19]
Jambhekar et al.

[11] Patent Number: 5,715,524
[45] Date of Patent: Feb. 3, 1998

[54] RADIO COMMUNICATION DEVICE WITH MOVABLE HOUSING ELEMENT CONTROL

[75] Inventors: Shrirang N. Jambhekar, Schaumburg; Daniel L. Williams, Vernon Hills, both of Ill.

[73] Assignee: Motorola, Inc., Schaumburg, Ill.

[21] Appl. No.: 384,165

[22] Filed: Feb. 6, 1995

[51] Int. Cl.$^6$ ................................................ H04B 1/38
[52] U.S. Cl. ........................ 455/90; 455/128; 455/351; 455/550; 455/566
[58] Field of Search ..................... 455/89, 90, 128, 455/351, 348, 349, 550, 552, 566, 556, 557; 379/433, 434, 428, 58, 59; D14/138, 240

[56] References Cited

U.S. PATENT DOCUMENTS 5,554,996  9/1996  Chatzipetros .................. 455/89

*Primary Examiner*—Chi H. Pham
*Assistant Examiner*—Gertrude Arthur
*Attorney, Agent, or Firm*—Kirk W. Dailey; John G. Rauch; John J. Oskorep

[57] ABSTRACT

A radio communication device (103) provides several radio communication services including radiotelephone service, electronic mail service, faxing service etc. . . . The radio communication device has a main body housing element (107) and a movable housing element (109), radio circuitry (113), a touch screen display (119), and a switch (127). In a closed position, the radio communication device (103) has a first set of limited radiotelephone functions such as phone number input and sending and receiving phone calls. In an opened position, the radio communication device (103) has a different set of user functions which include radiotelephone functions, advanced radiotelephone functions, and messaging functions. The switch (127) provides a signal responsive to the movable housing element (109) moving to the open position. Thus, switching the radio communication device (103) between a first set of user functions and the second set of user functions.

7 Claims, 4 Drawing Sheets

100

RADIO COMMUNICATION DEVICE WITH MOVABLE HOUSING ELEMENT CONTROL

FIELD OF THE INVENTION

Generally, the present invention relates to controlling a communication device with a movable housing element and more specifically to a radio communication device having two sets of user functions controlled with a movable housing element.

BACKGROUND OF THE INVENTION

Today, radio communication devices provide radio communication services such as two-way radio service, radiotelephone service, cellular phone service, cordless phone service and wireless data communication services such as wireless fax, electronic mail (e-mail), and short message service. These services are generally packaged individually into a single radio communication service device, such as a traditional radiotelephone. By packaging these radio communication services as individual devices, a manufacturer can offer a portable or hand held radio communication device that is relatively easy to use. However, there is increasing pressure in the marketplace to provide a multifunctional radio communication device that offers more than one of the typical radio communication services mentioned above. Attempting to combine such radio communication services into a single radio communication device creates a cumbersome user interface that is undesired by potential customers. A typical user interface includes a speaker, a microphone, a display and a data input device such as a keypad. For some radio communication services a small display and a small data input area is required. For example, in a portable radiotelephone often there is a small display and a fixed data input keypad. On the other hand, a wireless data service such as e-mail requires extensive display of received messages as well as extensive user data input from either a pen or a keyboard.

If a manufacturer was to provide an integrated product that combined a radiotelephone and an e-mail service, the simpler user interface of the radiotelephone service would be lost in the complex user interface required for an e-mail service. Thus, it would be advantageous to provide an integrated data communication device wherein a user could easily identify the user interface of a first data service from a user interface of a second data service.

DETAILED DESCRIPTION OF A PREFERRED EMBODIMENT

An embodiment of the present invention encompasses a radio communication device having a main body housing element and a movable housing element coupled thereto. The movable housing element is movable between an open or extended position and a closed position. The radio communication device includes radio circuitry, a much screen display, and a switch. The movable housing element covers a portion of the touch screen display when the movable housing element is in a closed position. In the closed position, the radio communication device has a first set of user functions. The first set of user functions includes limited radiotelephone functions such as phone number input and sending and receiving phone calls. When the movable housing element is in the open or extended position, the radio communication device has a second set of user functions which include radiotelephone functions, advanced radiotelephone functions, and messaging functions. The messaging functions include electronic mail, faxing, and short message service. The radio communication device switch provides a signal to a radio communication device processor responsive to the movable housing element moving to the open or extended position, thus switching the radio communication device between a first set of user functions and the second set of user functions.

Figure 1:
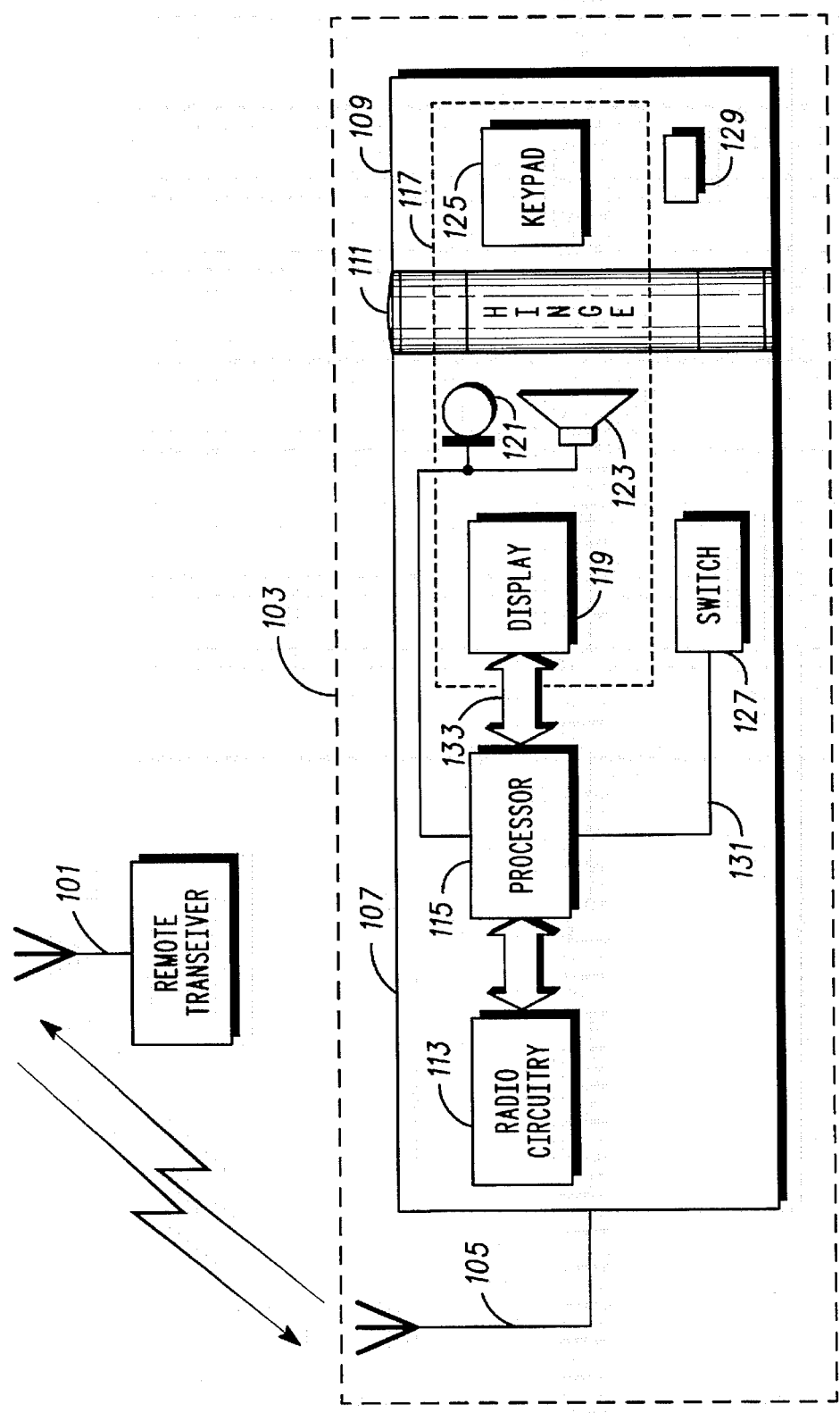
FIG. 1 is an illustration in block diagram form of a radio communication system in accordance with the present invention.

FIG. 1 is an illustration in block diagram form of a radio communication system. The radio communication system 100 includes a remote transceiver 101. In the radio communication system 100 the remote transceiver 101 sends and receives radio frequency (RF) signals to and from multiple radio communication devices within a fixed geographic area. The radio communication device 103 is one such radio communication device contained within the geographic area served by the remote transceiver 101. The RF signals transmitted between the remote transceiver 101 and the radio communication device 103 provide radio communication services such as radiotelephone service, electronic mail service, wireless fax service and short message service. Other equally sufficient embodiments of the present invention may include other combinations of these communication services and other radio communication services.

The radio communication device 103 includes an antenna 105, a main body housing element 107, a movable housing element 109, and a hinge 111 for coupling the movable housing element 109 to the main body housing element 107. In the preferred embodiment, the main body housing element 107 includes radio circuitry 113, a processor 115, and a portion of a user interface 117. The user interface 117 includes a display 119, a microphone 121, a speaker 123, and a keypad 125. The display 119, the microphone 121, and the speaker 123 are disposed within the main body housing element 107. The keypad 125 is disposed within the movable housing element 109 in the preferred embodiment. Additionally, the radio communication device 103 includes a switch 127 disposed within the main body housing element 107 and a switch activation device 129 disposed within the movable housing element 109. It is anticipated that other equally sufficient embodiments of the present invention would include a radio communication device that equally disposed components between a main body housing element and a movable housing. Such an embodiment would dispose at least a portion of the radio circuitry within the main body housing element.

Upon reception of RF signals, the radio communication device 103 receives the RF signals through the antenna 105. The antenna 105 converts the received RF signals into electrical RF signals for use by the radio circuitry 113. The radio circuitry 113 demodulates the electrical RF signals and recovers the data transmitted using the RF signals. Additionally, the radio circuitry 113 outputs the data to the processor 115. The processor 115 includes at least a main microprocessor such as an MC68040 available from Motorola, Inc., and associated memory as well as other control circuits including integrated circuits or other known technologies. The processor 115 formats the data output from the radio circuitry 113 into a recognizable voice or messaging information for use by the user interface 117. The user interface 117 communicates the received information or voice to a user through the use of the speaker 123 and the display 119.

Upon transmission of RF signals from the radio communication device 103 to the remote transceiver 101, the user interface 117 transmits user input data to the processor 115. Such data may include voice data and/or messaging information. The processor 115 formats the information obtained from the user interface 117 and transmits the formatted information to the radio circuitry 113. The radio circuitry 113 converts the formatted information into electrical RF modulated signals to the antenna 105 for transmission back to the remote transceiver 101.

Figure 2:
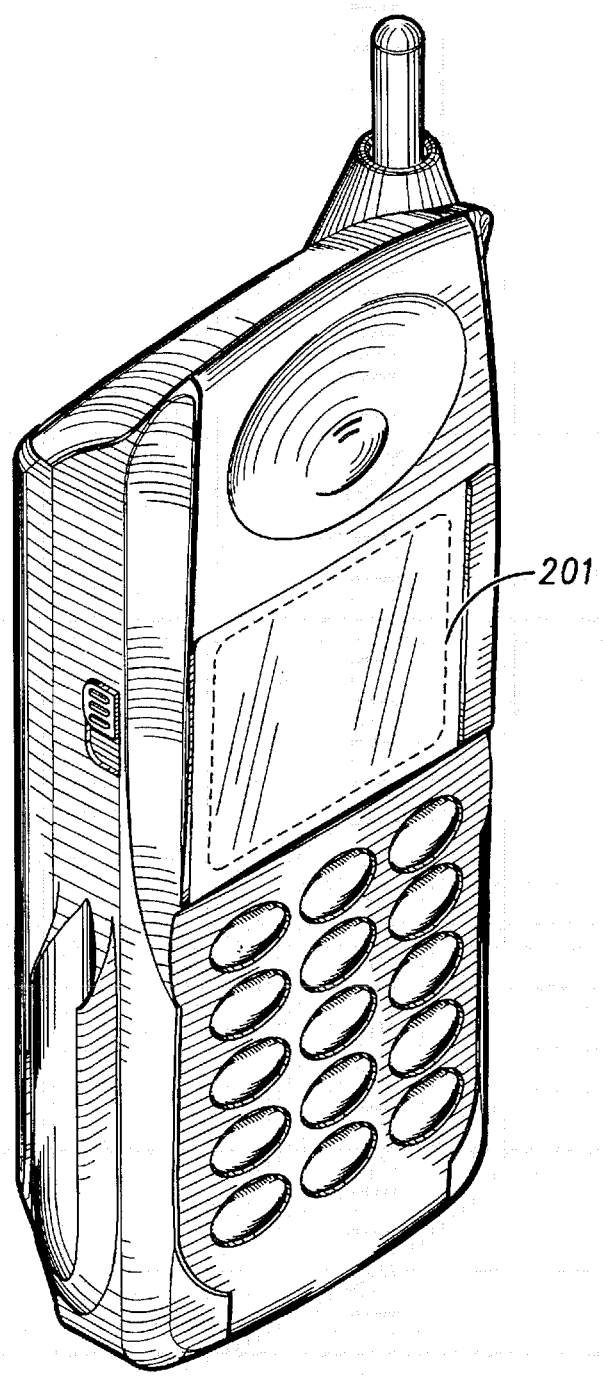
FIG. 2 is a detailed illustration of a radio communication device in a closed position in accordance with the present invention.
Figure 4:
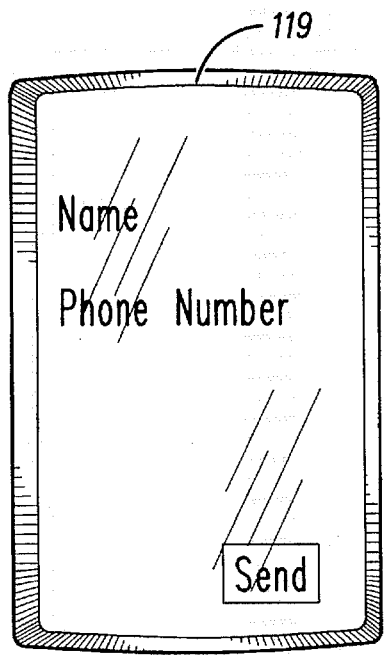
FIG. 4 is an illustration of a display in the portrait mode in accordance with the present invention.

In the preferred embodiment, the movable housing element 109 has a first position and second position, also referred to as an open position and a closed position. FIG. 2 is a detailed illustration of the radio communication device 103 of FIG. 1 in the closed position. When the movable housing element 109 is in the closed position, it covers a portion of the touch screen display 119 and the radio communication device 103 has a limited first set of user functions available. The limited set of user functions include only radiotelephone functions such as inputting telephone numbers, initiating and ending telephone calls and recalling phone numbers from a memory. This limited set of user functions is related to the functions available on a low tier radiotelephone available today. In the closed position a portion of the touch screen display 119 is exposed to the user. This exposed portion contains a data display area 201 for displaying radiotelephone feedback such as a telephone number, a signal strength, a battery level, and roaming information. The information displayed in the data display area is oriented vertically, hereinafter referred to as a portrait mode, as illustrated in FIG. 4.

In the preferred embodiment, the movable housing element 109 includes a keypad 125. The keypad 125 includes a plurality of individual keys including a limited number of function keys and a number pad containing individual keys numbered 0–9. Each individual key is disposed within the movable housing element 109. Each key has a first portion of the key exposed on a first side of the movable housing element 109 and a second portion of the key is exposed on a second side of the movable housing element 109. The keys are arranged such that when the movable housing element 109 is in the closed position, the plurality of keys are arranged adjacent to a user data area (not shown) of the touch screen display 119. The user data area of the touch screen display 119 is covered by the movable housing element 109 and is divided up into multiple user data sub-areas which correspond to the plurality of keys of the keypad 125. When the first portion of a first key is depressed by a user, the second portion of the first key provides a pressure against the touch screen display and activates a corresponding user data sub-area. This activation of the particular user data sub-area of the touch screen display 119 creates a corresponding signal that is sent back to the processor 115 to interpret the meaning of the activation. This signal is sent via the display bus 133.

Figure 3:
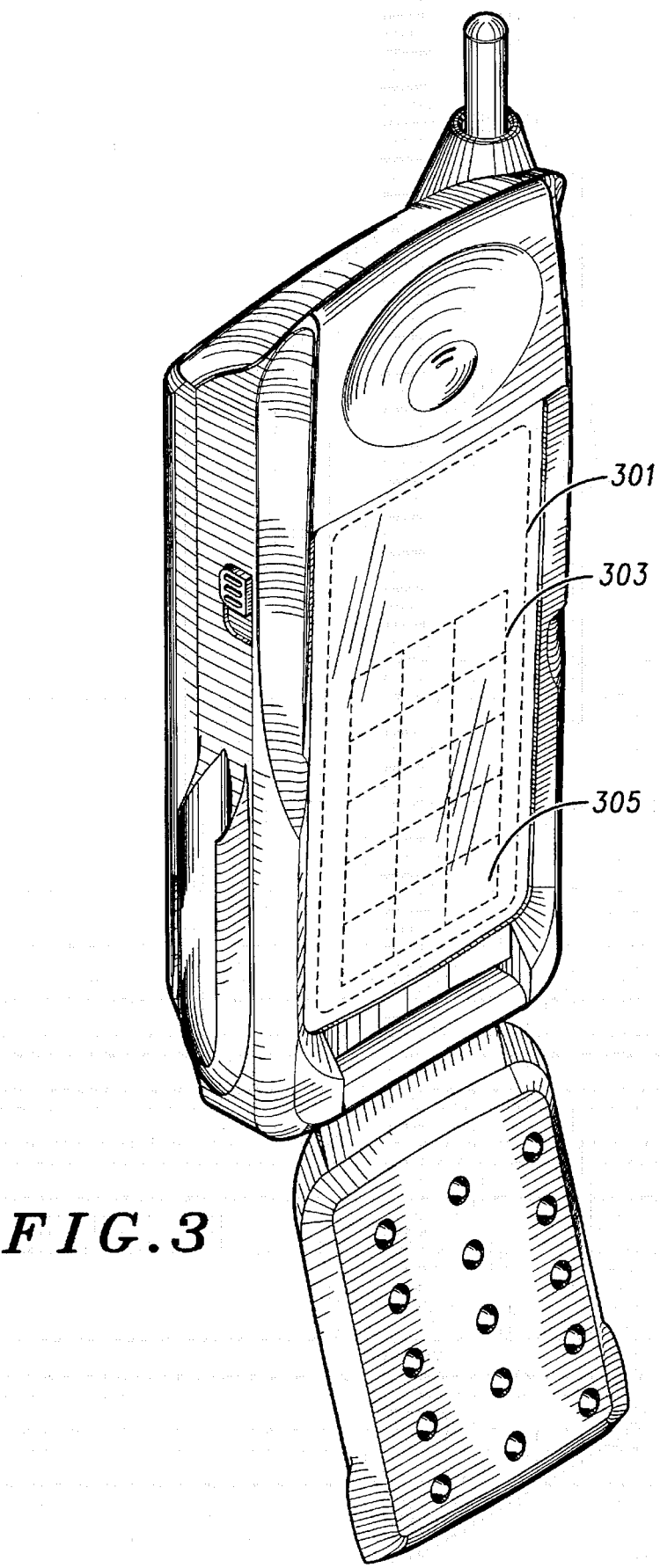
FIG. 3 is a detailed illustration of a radio communication device in accordance with the present invention.

FIG. 3 is a detailed illustration of the radio communication device 103 of FIG. 1 in the opened position. As the movable housing element 109 is moved to the open or extended position the switch activation device 129 in conjunction with the switch 127 creates a mode change signal 131 that is sent to the processor 115, as illustrated in FIG. 1. The mode change signal 131 indicates to the processor 115 that the movable housing element 109 is being opened and a second set of user functions becomes available to the user. In the preferred embodiment, the second set of user functions includes advanced radiotelephone control functions and messaging functions such as wireless faxing, electronic mail and short messaging service.

Figure 5:
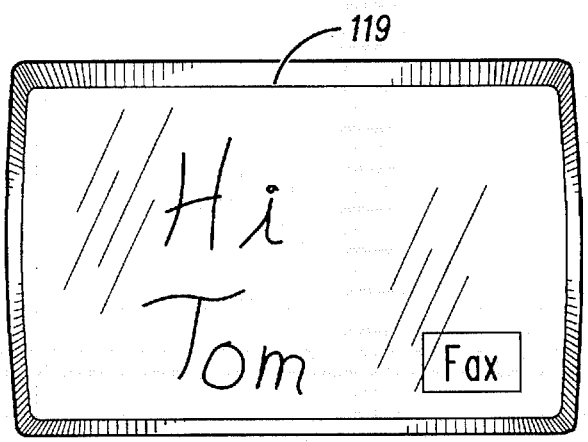
FIG. 5 is an illustration of a display in the landscape mode in accordance with the present invention.

With the movable housing element 109 in the open or extended position, the radio communication device 103 has a second set of user functions. This second set of user functions includes advanced radiotelephone control functions and messaging functions. The advanced radiotelephone functions include a menu for storing and recalling telephone numbers as well as programming the user's preferences for controlling the radiotelephone. All of the radiotelephone control functions, including the advanced and the limited radiotelephone control functions, are displayed in a radiotelephone display configuration. This configuration includes orienting the display in the portrait mode as discussed above and illustrated in FIG. 4. All of the messaging functions including electronic mail, faxing and short message service are displayed in a messaging display configuration. This configuration includes orienting the display in the horizontal direction, hereinafter referred to as the landscape mode, as illustrated in FIG. 5. Additionally, when the movable housing element 109 is in the opened position, the display arrangement for the touch screen display 119 is reconfigured. This reconfiguration includes increasing the data display area 301 to include the entire touch screen display 119 and it also changes the number of user data sub-areas 305 in the user data area 303. In the preferred embodiment the data display area 301 and the user data area 303 overlap each other when the movable housing element 109 is in the extended or opened position.

Additionally, the radio communication device 103 performs additional functions responsive to the movable housing element 109. Specifically, as the movable housing element 109 moves from the closed position to the opened position, the radio communication device 103 can perform an off-hook function. As the movable housing element 109 moves from the opened position to the closed position, the radio communication device 103 can perform an on-hook function. Furthermore, any other predetermined radio communication device control function can be performed in response to moving the movable housing element between the first position and the second position.

Alternatively, the first set of user functions may include exclusively radiotelephone control functions and the second set of user functions may include exclusively messaging functions. In this alternative embodiment, when the movable housing element 109 is in the closed position, the radio communication device 103 functions only as a radiotelephone. When the movable housing element 109 is in the open or extended position, the radio communication device 103 operates solely as a messaging communication system. Consequently, the touch screen display 119 would be oriented in the portrait mode while the movable housing element 109 is closed and, in response to moving the movable housing element 109 to the open position, the touch screen display 119 would be reconfigured to the landscape mode, as illustrated in FIG. 5.

In the detailed illustration of the portable radio communication device 103 in FIG. 2 and FIG. 3, the movable housing element 109 is a flap. It is anticipated that other equally sufficient embodiments of a movable housing element 109 may be substituted therefor. These other embodiments include: a clam shell type housing element, a swivel type housing element and a sliding type housing element. By providing a radio communication device that has two distinct sets of user functions to control a plurality of radio communication services, the preferred embodiment creates a simpler user interface for the plurality of radio communication services, than would otherwise be available to a user of a radio communication device providing a plurality of radio communication services.

What is claimed is:

1. A radio communication device having radio circuitry disposed therein and a plurality of user functions, the radio communication device comprising:

a body housing element having at least a portion of the radio circuitry disposed therein;

a movable housing element having a first side and a second side, the movable housing element coupled to the body housing element and movable between at least a first position and a second position;

a touch screen display disposed within the body housing element, the touch screen display exposed on a first side of the body housing element such that when the movable housing element is in the second position, the movable housing element covers at least a first portion of the touch screen display, the touch screen display including a plurality of display arrangements, the plurality of display arrangments including a first display arrangement orienting at least a portion of the touch screen display in a landscape mode and a second display arrangement orienting at least a portion of the touch screen display in a portrait mode;

a keypad disposed in the movable housing element, the keypad including at least a first key, the first key having a first portion exposed on the first side of the movable housing element and a second portion exposed on the second side of the movable housing element, the first portion of the first key being outwardly exposed and the second portion of the first key being positioned adjacent to the touch screen display when the movable housing element is in the second position, the second portion of the first key capable of making contact with the touch screen display when the first portion of the first key is depressed, the contact causing the touch screen display to generate a predetermined signal for operating the radio communication device; and a switch responsive to the movable housing element, the switch for switching between a first set of functions and a second set of functions, the first set of functions operable when the movable housing element is in the first position and the second set of functions operable when the movable housing element is in the second position, the first set of functions including messaging functions using the touch screen display and the second set of functions including functions for initiating telephone calls using the keypad, the first set of functions corresponding to the first display arrangement and the second set of functions corresponding to the second display arrangement.

2. A radio communication device having radio circuitry disposed therein and a plurality of user functions, the radio communication device comprising:

a body housing element having at least a portion of the radio circuitry disposed therein;

a movable housing element having a first side and a second side, the movable housing element coupled to the body housing element and movable between at least a first position and a second position;

a touch screen display disposed within the body housing element and including a plurality of data sub-areas, the touch screen display exposed on a first side of the body housing element such that when the movable housing element is in the second position, the movable housing element covers at least a first portion of the touch screen display;

a keypad disposed in the movable housing element, the keypad having a plurality of keys including a first key, the plurality of keys corresponding to the plurality of data sub-areas of the touch screen display, the first key having a first portion exposed on the first side of the movable housing element and a second portion exposed on the second side of the movable housing element, the first portion of the first key being outwardly exposed and the second portion of the first key being positioned adjacent to the touch screen display when the movable housing element is in the second position, the second portion of the first key capable of making contact with the touch screen display when the first portion of the first key is depressed, the contact causing the touch screen display to generate a predetermined signal for operating the radio communication device; and a switch responsive to the movable housing element, the switch for switching between a first set of functions and a second set of functions, the first set of functions operable when the movable housing element is in the first position and the second set of functions operable when the movable housing element is in the second position, the first set of functions including advanced communication functions using the touch screen display and the second set of functions including functions for initiating telephone calls using the keypad.

3. The radio communication device of claim 2 further comprising:

a plurality of display arrangements for arranging multiple configurations of the touch screen display, a first configuration including a user data area having the plurality of data sub-areas for touch activation when the movable housing element is in the first position.

4. A radio communication device having radio circuitry disposed therein, the radio communication device having a body and a movable element, the movable element being coupled to the body and movable between an open position and a closed position a portion of the radio circuitry is disposed within said second housing, the radio communication device comprising:

a processor for providing:

a first set of functions for operating the radio communication device as a radiotelephone, the first set of functions including functions for initiating and receiving telephone calls, the first set of functions available when the movable element is in the closed position;

a second set of functions for operating the radio communication device as a messaging system, the second set of functions including functions for sending and receiving text information, the second set of functions available when the movable element is in the open position;

a display disposed in the body, the display having at least a first portion for displaying information in one of a portrait mode and a landscape mode; and a switch responsive to the positioning of the movable element, the switch providing a signal for selecting between the first and the second set of functions of the processor and between the portrait and landscape mode of the display.

5. A radio communication device having radio circuitry disposed therein, the radio communication device comprising:

a body housing element, the body housing element having at least a portion of the radio circuitry disposed therein;

a movable housing element, the movable housing element coupled to the body housing element and movable between at least an open position and a closed position; and a display, the display displaying information in a portrait mode when the movable housing element is in the closed position, the display displaying information in a landscape mode when the movable housing element is in the open position.

6. The radio communication device according to claim 5 wherein the movable housing element covers at least a portion of the display when the movable housing element is in the closed position.

7. The radio communication device according to claim 6 wherein the display comprises a touch screen display.

* * * * *

UNITED STATES PATENT AND TRADEMARK OFFICE
CERTIFICATE OF CORRECTION

PATENT NO. : 5,715,524
DATED : Feb. 3, 1998
INVENTOR(S) : Jambhekar et al.

It is certified that error appears in the above-indentified patent and that said Letters Patent is hereby corrected as shown below:

Claim 4

In column 6, lines 5 and 6 of claim 4, please remove "a portion of the radio circuitry is disposed within said second housing"

Signed and Sealed this

Fourteenth Day of July, 1998

Attest:

BRUCE LEHMAN

Attesting Officer        Commissioner of Patents and Trademarks